(No Model.)
R. C. ELLRICH.
RATCHET SCREW DRIVER.
No. 425,998. Patented Apr. 22, 1890.
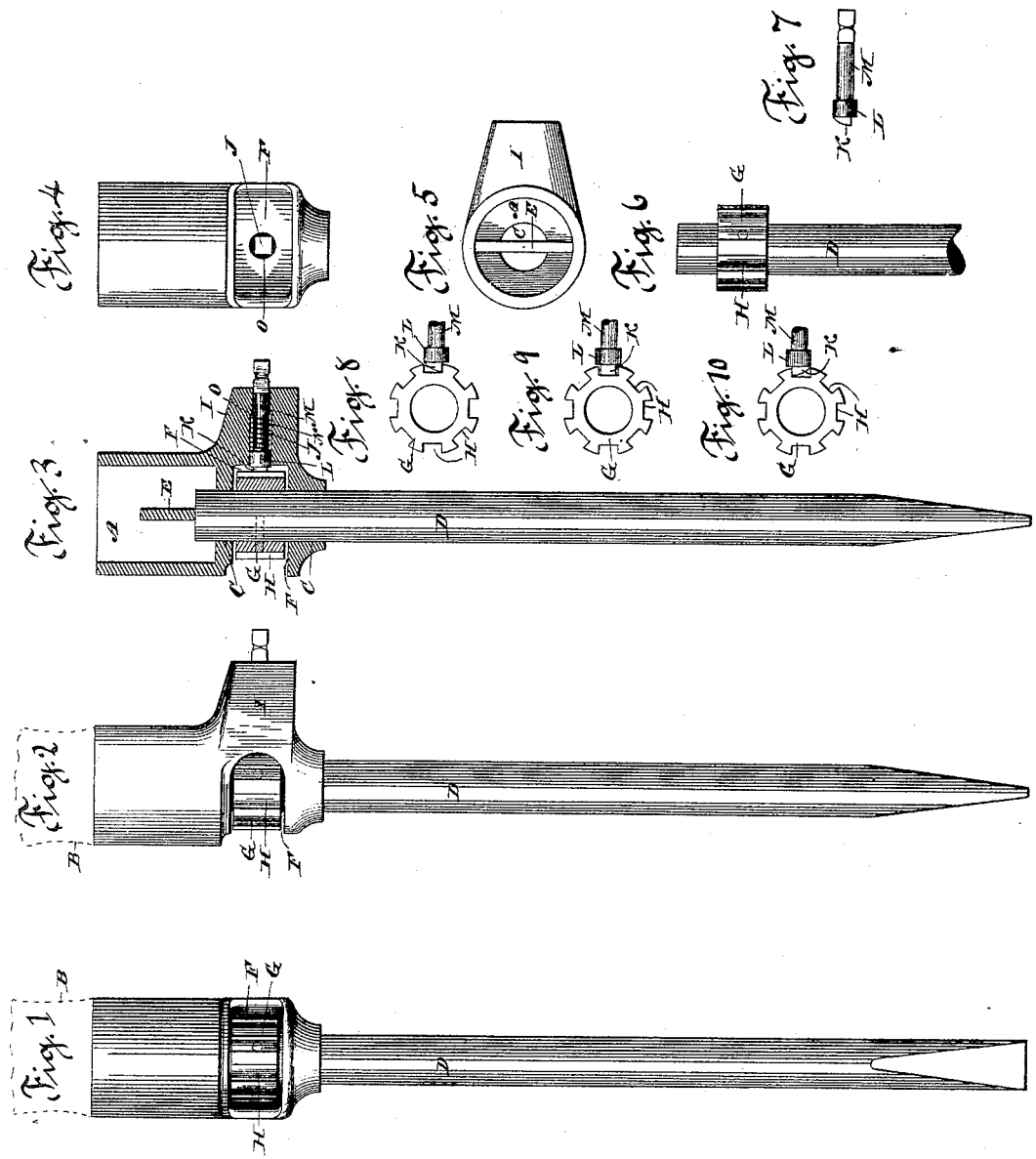
Witnesses:
Chas. B. Shumway
Wm. H. de Maurise
Inventor
Robert C. Ellrich
By George D. Seymour
Atty.

UNITED STATES PATENT OFFICE.

ROBERT C. ELLRICH, OF PLANTSVILLE, CONNECTICUT.

RATCHET SCREW-DRIVER.

SPECIFICATION forming part of Letters Patent No. 425,998, dated April 22, 1890.

Application filed March 15, 1889. Serial No. 303,400. (No model.)

*To all whom it may concern:*

Be it known that I, ROBERT C. ELLRICH, residing at Plantsville, in the county of Hartford and State of Connecticut, have invented certain new and useful Improvements in Ratchet Screw-Drivers; and I do declare the following to be a full, clear, and exact description of the same, reference being had to the accompanying drawings, which form part of this specification.

My invention relates to an improvement in ratchet screw-drivers, the object being to produce a durable, efficient, compact, and convenient device at small cost.

With these ends in view my invention consists in certain details of construction and combination of parts, as will be hereinafter described, and pointed out in the claims.

In the accompanying drawings, Figure 1 is a view in front elevation of the head and shank of a screw-driver constructed in accordance with my invention, the handle being shown in dotted lines. Fig. 2 is a view of the same parts in side elevation. Fig. 3 is a view of the parts in central longitudinal section. Fig. 4 is a detached view in front elevation of the head. Fig. 5 is a plan view thereof. Fig. 6 is a detached broken view, in side elevation, of the shank with the ratchet-wheel in place thereon. Fig. 7 is a view in side elevation of the dog. Fig. 8 is a detached plan view of the ratchet-wheel and dog and showing the adjustment of the latter for the right-hand action of the former. Fig. 9 is a similar view showing the adjustment of the dog for locking the ratchet-wheel, and Fig. 10 is a similar view showing the adjustment of the dog for the left-hand action of the ratchet-wheel.

The head or frame of the device is made in one piece of cast metal, and is provided at one end with a socket A, which receives the handle B. A hole or bore C, leading from the center of the inner end of the socket through the opposite end of the head, receives the butt-end of the shank D, which abuts and turns against a web E, extending transversely across the socket. A transverse slot or recess F, formed between the inner end of the socket and the opposite end of the head, is provided to receive the ratchet-wheel G, which is rigidly secured to the shank and furnished with a circular series of transverse retaining-slots H, as shown. A lateral arm or extension I, offsetting from the head at a point opposite the said recess, is provided with a longitudinal chamber J, to receive a dog consisting of a beveled nose K, a collar L, located directly behind the same, and a shank M, the projecting outer end whereof is necked to enable it to be more readily grasped by the fingers of the hand. A light spiral spring N, located in the chamber J aforesaid, impinges at one end against the collar of the dog and at the other end against a shoulder O, forming a break in the said chamber. The said dog is rotatable on its longitudinal axis to present its beveled nose in different ways to the periphery of the ratchet-wheel, into the retaining-slots whereof its nose enters. As shown in Fig. 8 of the drawings, the nose of the dog is turned transversely across a retaining-slot in the ratchet-wheel, which engages with the bevel of the nose when the driver is turned to the right and pushes the dog back. In Fig. 9 of the drawings the nose of the dog is shown as standing with the length of a retaining-slot in the ratchet-wheel, which is now locked in place. Fig. 10 of the drawings shows the nose of the dog as standing transversely across the ratchet-wheel, with the bevel of its nose faced, so that when the driver is turned to the left the wheel will push the dog out of the way. It will be understood that the dog is brought into the several positions described by seizing its outer end with the fingers and pulling it out against the force of the spiral spring until its nose clears the ratchet-wheel, and then rotating it a quarter or a half turn, according as it may be desired to lock the shank or to convert the driver from right to left hand action, or vice versa.

It will be noticed that under the described construction the upper and lower faces of the wheel are inclosed and protected as well as a part of its periphery. My construction is also distinguished among ratchet screw-drivers by the fewness of its parts, its convenience of operation, and its strength and durability. It is also very compact and may be produced at a small cost.

If desired, the ratchet-wheel may be dispensed with and the ratchet formed by cutting the teeth in the butt-end of the driver so as to be in line with the rotatable dog in the chambered lateral extension of the head.

Having fully described my invention, what I claim as new, and desire to secure by Letters Patent, is—

1. In a ratchet screw-driver, the combination, with a head having a handle-socket at one end, a longitudinal bore located in line with the said socket at the other end, and a chambered lateral extension having a chamber located in a line extending transversely between the inner end of the said socket and the outer end of the said bore, of a driver entering the bore in the head and provided with a ratchet located in line with the said chamber, and a rotatable dog located in and extending at its outer end through the said chamber, whereby it can be turned at will, and having a beveled nose, which engages the ratchet upon the driver, substantially as set forth.

2. In a ratchet screw-driver, the combination, with a head having a handle-socket, a bore leading from the center of the inner end of such socket through the opposite end of the head, a web located in the socket in line with such bore, a transverse recess formed between the inner end of the socket and the other end of the head, and a longitudinally-chambered extension in line with such recess, of a shank having its butt-end entered into the bore of the head to engage with the web therein, a ratchet-wheel located within the recess and rigidly secured to the butt-end of the shank, and a spring-actuated rotatable dog located in the chambered extension of the head, and having a beveled nose for engagement with the ratchet-wheel and projecting at its outer end beyond the extension for manual operation, substantially as set forth.

In testimony whereof I have signed this specification in the presence of two subscribing witnesses.

ROBERT C. ELLRICH.

Witnesses:
CHAS. B. SHUMWAY,
WM. J. DE MAURIAC.